United States Patent
Sra et al.

(12) United States Patent
    Sra et al.

(10) Patent No.: US 7,817,801 B2
(45) Date of Patent: Oct. 19, 2010

(54) METHOD AND APPARATUS FOR EMBEDDING DATA WITHIN THE VERTICAL BLANKING INTERVAL OF VIDEO TRANSMISSIONS

(75) Inventors: Amritpal Sra, Fremont, CA (US); Shan Zhu, Sunnyvale, CA (US)

(73) Assignee: PrediWave Corporation, Los Gatos, CA (US)

( * ) Notice: Subject to any disclaimer, the term of this patent is extended or adjusted under 35 U.S.C. 154(b) by 1469 days.

(21) Appl. No.: 11/185,197

(22) Filed: Jul. 19, 2005

(65) Prior Publication Data

US 2007/0030966 A1 Feb. 8, 2007

(51) Int. Cl.
    *H04N 7/167* (2006.01)
(52) U.S. Cl. ............................. 380/201; 380/200; 705/57
(58) Field of Classification Search ........................ None
    See application file for complete search history.

(56) References Cited

U.S. PATENT DOCUMENTS 5,822,425 A * 10/1998 Ezaki et al. .................. 386/94
6,567,127 B1 * 5/2003 Orr et al. .................... 348/478
6,606,450 B1 * 8/2003 Klebanov et al. ............. 386/94
2003/0061489 A1 * 3/2003 Pelly et al. .................. 713/176
2003/0142959 A1 * 7/2003 Qu .............................. 386/94

* cited by examiner

*Primary Examiner*—Pramila Parthasarathy
(74) *Attorney, Agent, or Firm*—Perkins Coie LLP (57) ABSTRACT

The present invention teaches methods, systems and articles of manufacture for embedding information within the vertical blanking interval (VBI) of a video signal. Such embedded data may be operative for the control of a set-top-box receiver, VCR, DVD player/recorder, computer or television, or may contain software which may be installed on a receiver unit. Embedded data may include electronic signatures which identify the source of a video signal and may be used as a copy-protection message. The information is inserted into closed caption (CC1) bandwidth. The term CC1 bandwidth refers to the capacity for insertion of closed caption data within Channel 1 of the Line-21 (VBI) of the video program. The CC1 band is especially suited for use in embedding data both because CC1 data is invisible to content viewers and because the United States and other nations require CC1 content to be transmitted with all publicly distributed video content.

29 Claims, 9 Drawing Sheets

METHOD AND APPARATUS FOR EMBEDDING DATA WITHIN THE VERTICAL BLANKING INTERVAL OF VIDEO TRANSMISSIONS

CROSS REFERENCE TO RELATED APPLICATIONS

This patent application is related to co-pending U.S. patent application Ser. No. 10/062,573, entitled COPYING METHOD AND APPARATUS, which is incorporated by reference herein.

BACKGROUND OF THE INVENTION

1. Field of the Invention

The present invention relates to video signal copy-protection technology. In particular, the present invention teaches a method and apparatus for embedding digital data within a video signal such that a television receiver may still produce a normal viewing picture and wherein the embedded digital data may be retrieved by a viewing or recording device, or other hardware.

2. Description of the Related Art

To protect valuable rights in video information, there exists a need for embedding information within a video signal without degrading the signal quality or requiring increased transmission bandwidth, wherein the embedded information may be retrieved by a video receiver system for various purposes. This is increasingly important as large screen, high resolution monitors become widespread, and high picture quality essential. It is also important that such signatures be compatible with digital television processes and components.

Currently standard video broadcast media includes a plurality of field tracks. Each track includes all the video information required for a single TV picture. The beginning of each track includes a vertical blanking interval which is followed by all of the video information for a single TV picture. The NTSC standard has 525 lines of video data in one display picture. However lines 1-21 are not visible. Various data may be stored on any of the lines 1-21, and possibly other lines. Messages embedded into the VBI lines may either be removed intentionally by the equipment used for transmission and reception, or un-intentionally by people who stand to benefit by its removal. E.g. information sent over the XDS channel of line-21 is blocked by most broadcast equipment. Only line-21 CC1 channel has the legal 'right of support' in consumer electronics equipment. CC1 channel however, is used for closed captioning and can be displayed on screen. Any non-captioning information sent on CC1 may be viewed by the audience as noisy captions.

Line 21 stores close caption data, while lines 1-20 store other types of information. Line 21 of the VBI is referred to as the CC1 channel of NTSC video signals. Only Line 21 CC1 channel is assigned a protected status by the U.S. and other governments, such that information contained on CC1 of a video signal must be supported by all systems operating in these countries. Any information contained within line 21 will be passed along with video information, and will not be removed.

What is needed is an improved method and apparatus for modifying a video signal so that copying of the modified signal is prevented in a reliable and inexpensive manner, is not easily defeated, yet allows a normal picture to be produced by a television receiver receiving the modified video signal with no impact on picture quality. This invention's goal is to provide a mechanism that embeds data within the CC1 channel of NTSC (or PAL) video signal such that it is non-intrusive to other data or active video, and also is guaranteed legal (regulatory) protection against removal during its transport to the consumer.

SUMMARY OF THE INVENTION

The present invention teaches a variety of methods, systems and articles of manufacture for embedding information within the vertical blanking interval (VBI) of a video signal. Such embedded data may be operative for the control of a set-top-box receiver, DVD player, VCR, DVD recorder, computer or television, or may contain software which may be installed on a receiver unit. Embedded data may also include an electronic signature which identifies the source of a video signal and may be used as a copy-protection message. In preferred embodiments, the information is inserted into closed caption (CC) bandwidth. As used herein, the term CC bandwidth refers to the capacity for insertion of closed caption data within the video program.

The encoding methods of the present invention effectuate control of an underlying data embedding mechanism by encoding a video program prior to use by an end user. The embedded data is implemented at a video program receiving device such as a VCR, STB or other such viewing or recording device. The embedded data may include copy-protection codes inserted into a video program at any suitable stage during the provision of the video program to an end user such as during content authoring or video broadcast.

The embedded codes of the present invention are suitable for use with analog and digital video programs. The preferred embodiment of the present invention utilizes CC bandwidth, and there exist both analog and digital video formats which support CC data encoding. The present invention is not limited to formats supporting CC data encoding.

Embodiments of the present invention which utilize the CC1 bandwidth must use embedded code which will not be displayed on the video screen with the video program, and should also not interfere with the normal function of the original closed caption coding of video content.

The present invention also teaches that the underlying information embedding mechanism can be implemented in a variety of ways. The present invention contemplates copy-protection mechanisms having multiple levels of copy-protection. These multiple levels of copy-protection may include varying levels of degradation of subsequent copies as well as absolute prohibition of subsequent copying.

A first aspect of the present invention teaches a video encoding method for providing embedded information within a video program, the video encoding method encoding at least one code within CC bandwidth of said video program. Another embodiment of the present invention teaches a computer readable medium encoded with at least one copy-protection code within closed captioning (CC) bandwidth of said video program. A still further embodiment teaches a video program encoded with at least one command code sequence within CC bandwidth of the video program. The present invention also teaches a data carrier wave having at least one copy-protection code encoded within a portion of the data carrier wave intended for use in providing closed caption (CC) data.

Related aspects of the present invention teach a receiver mechanism responsive to a frequency of insertion of the embedded code. The method operates such that certain portions of the video program or computer readable medium are encoded with various codes at a frequency of insertion such that the receiver mechanism is controlled as desired.

Other related embodiments teach that activation of the copy-protection mechanism is initiated when the frequency of insertion of the copy-protection codes is greater than or equal to a copy-protection initiation frequency. The copy-protection mechanism may be maintained in an on state when the frequency of insertion of the copy-protection codes is greater than or equal to a copy-protection maintenance frequency, the copy-protection maintenance frequency possibly being less than the copy-protection initiation frequency.

Another preferred embodiment of the present invention teaches a copy-protection video program encoding system operable to insert copy-protection codes within closed captioning bandwidth of a video program. A related embodiment teaches an encoding system having a data merger device and a CC encoder. In preferred embodiments, the data merger device has a first CC data input, copy-protection data input, and a CC data output. The data merger device is operable to merge data received at the copy-protection data input and the specific CC data output. The CC encoder has a second CC data input coupled to the data merger device CC data output, a video data input, and a video data output. The CC encoder is operable to encode data received at the second CC data input within a CC bandwidth portion of a video program received at the video input. This embodiment of the present invention is operable for either analog or digital video.

The present invention still further contemplates a copy-protection decoding method which receives a video program, and analyzes a CC portion of the video program for copy-protection codes. The method teaches controlling the copy-protection mechanism as indicated by the copy-protection codes. In a related aspect of the present invention, the copy-protection mechanism stays activated when the frequency of anti-protection encoding within the video program is greater than or equal to a predefined activation frequency. According to this aspect, analyzing the copy-protection codes within the CC portion of the video program includes determining the frequency of anti-protection encoding within the video program.

Yet another aspect of the present invention teaches a method for copy-protection in a video program including encoding a video program with a character code in the vertical blanking interval of a video field such that the character code may be decoded in a video recording device in order to disable a recording process of the video program. The method also teaches disabling the recording process in response to a content of the character code.

Another related aspect of the present invention teaches storing a reference code in a video recording device, comparing the reference character code with the character code decoded from the CC1 of the video input, and disabling the recording process based on a comparison of the decoded character code and the reference character code. The present invention further teaches a method for recording a copy-protected video program with a video recording device including decoding a character code in a vertical blanking interval of a video field, and enabling recording of the video program in response to the character code.

Still further, the present invention teaches a video transmission receiver for receiving copy protected video programs. The video transmission receiver of this aspect includes a decoding device for decoding copy-protection codes incorporated in a video program, a memory operative for storing a reference code, a comparator for comparing the reference code with the copy-protection codes in order to produce an output responsive to the reference code and the copy-protection codes; a control device operative to limit recording and playback of the video program in response to the output of the comparator, and a recording device for recording and playback of the video program.

DETAILED DESCRIPTION OF THE PREFERRED EMBODIMENT(S)

The present invention teaches methods and apparatus for embedding information within a video signal which may be used to control a data receiver unit. In preferred embodiments, the information is inserted into closed caption channel (CC) which has limited bandwidth. As used herein, the term bandwidth refers to the capacity for insertion of closed caption data within the video program. In an analog video program, e.g., copy-protection codes can be inserted into the CC1 channel of line 21 of the Vertical Blanking Interval (VBI). Those skilled in the art will appreciate that often little of the CC bandwidth is used and is thus readily available for the encoding of the present invention.

NTSC signal has 525 lines that are handled in two fields. The odd field consists of lines 1 to 263, and the even field consists of line 264 to 525. The Vertical Blanking Interval (VBI) consists of lines 1 to 21 of the odd field, and 264 to 284 of the even field. The VBI lines are not displayed on the screen. They are used to synchronize the display equipment, carry data, or are let blank. Line-21 in particular, has been standardized to carry closed-captions (and other data), and has been protected by federal regulation, which requires every equipment and transport channel to support line-21. The EIA-608B standard regulates the line-21 data services for consumer electronics equipment that is designed to work with the NTSC video signal. line-21 can also be used to carry copy-protection data. The current invention offers a novel way to send such data (but not limited to protection data only), by remaining compliant with the current standard (EIA-608B), and also avoiding any interference with other uses of line-21.

Compliance with the 608 standard ensures that any application of the invention can have immediate access to equipment already deployed (and currently being deployed) in the market. Further, the immunity to interference, and the unintrusive nature of the invention is valuable in several applications, including by not limited to copy-protection.

The encoding methods of the present invention involve the embedding of information by encoding a video program prior to use by an end user. The underlying embedded information may be read and implemented at a video program receiving device such as a STB or other such suitable device.

In preferred embodiments, digital information codes are inserted while authoring the video program and in conjunction with encoding of any desired CC data. Of course, during the full process of providing the video program to the end user there are many suitable opportunities for encoding desired data into the video program. For example, copy-protection codes may be inserted subsequent to authoring and simultaneously with broadcast of the video program or even at the end user's receiving device (e.g., a set top box).

The embedded codes of the present invention are suitable for use with analog and digital video programs. The preferred embodiment of the present invention utilizes CC bandwidth, and there exist both analog and digital video formats which support CC data encoding. The present invention is not limited to formats supporting CC data encoding and methods and devices for implementing the present invention in formats which do not directly support CC data encoding are described below in more detail.

As will be described below in more detail, the underlying data embedding mechanism can implement encoding of such embedded data in a variety of ways. The present invention contemplates copy-protection mechanisms having multiple levels of copy-protection. These multiple levels of copy-protection may include varying levels of degradation of subsequent copies as well as absolute prohibition of subsequent copying.

In the following description, certain method aspects of the present invention are described with reference to flow chart figures. These method steps need not be performed in a sequential manner as might be implied by such flow chart figures. Rather, the methods of the present invention should be implemented in the appropriate manner determined by those skilled in the art depending upon the underlying hardware and the specific application.

Figure 1A:
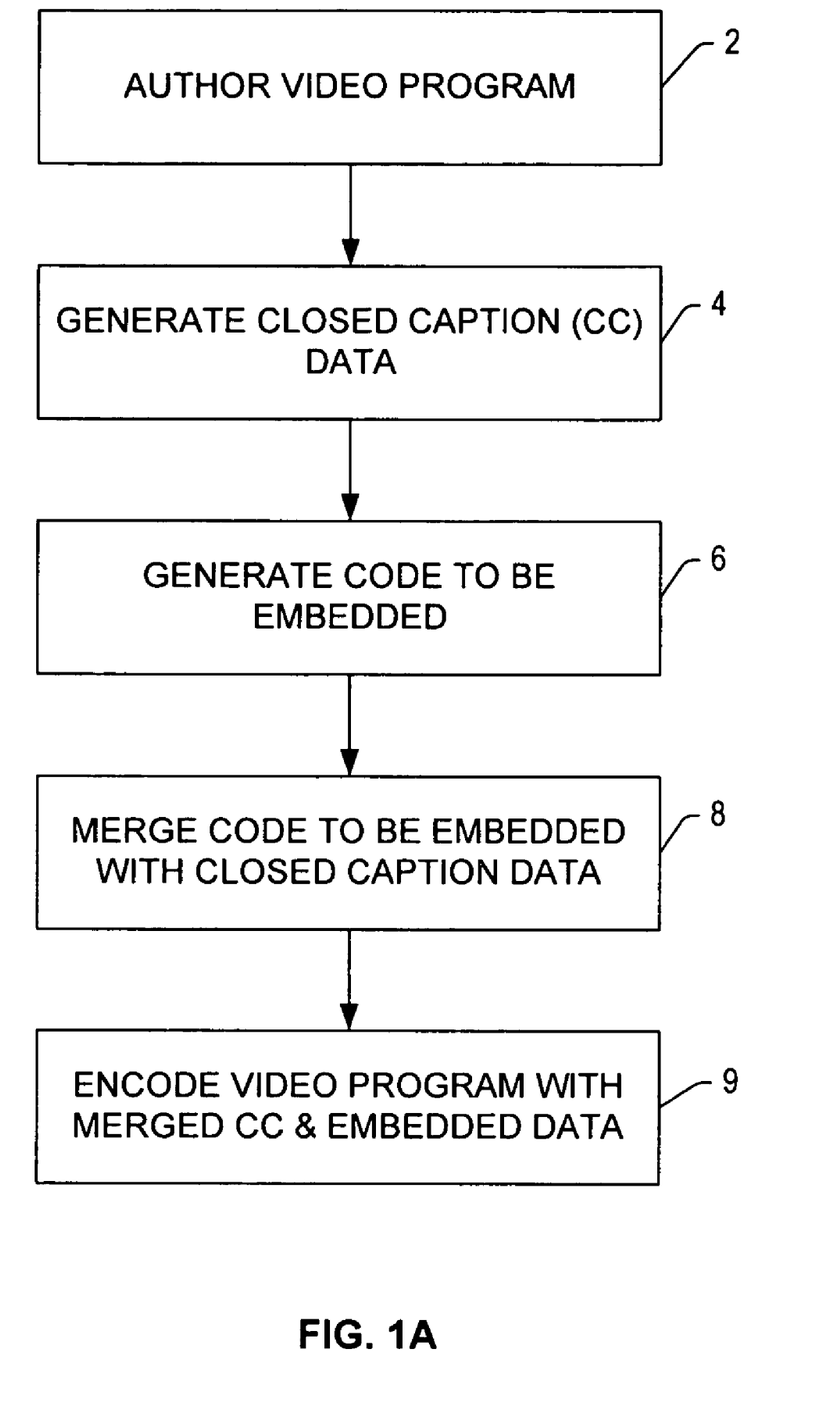
FIG. 1A is a flow chart showing an encoding method of the present invention.

FIG. 1 is a flow chart showing a video encoding method in accordance with a preferred embodiment of the present invention. The method effectuates the embedding of a message such as an electronic signature, a watermark, a computer command sequence, software or copy command sequence by encoding at the time of video content authoring. The method begins in a content authoring step 2 where a video program is initially authored or created. As will be appreciated, content authoring may accomplished in a variety of ways. For example, content authoring can be done "off-line" in a recording studio, or may be the result of content creation during a live broadcast.

With further reference to FIG. 1, a step 4 generates any desired CC data intended for use with the video program. The CC data generation may occur simultaneous with content authoring, or may be performed subsequently. The CC data may be created in real time simultaneous with a live broadcast. The step 4 is an optional step, as there may be no need for CC data or perhaps CC data will be later inserted.

A step 6 generates the required data to be embedded. The required codes depend upon the nature of the underlying message and the CC standard adhered to. For example, in the EIA-608 standard (7 bit code, 1 parity), codes 14, 20 (CC2) or 1C, 20 (CC2) may be used to signal the start of the embedded electronic signature, and codes (14, 20) CC1, (1C, 2E) CC2 may be used to signal the end of the embedded electronic signature. In accordance with one embodiment a command sequence is embedded within the CC1 channel in order to deliver commands to a video receiver device. Such commands may include a record disable command, or any other command useful to a consumer or video broadcaster. In accordance with another embodiment software updates may be contained within embedded data.

A step 8 merges the CC data together with the embedded information. The step 8 can be accomplished in a variety of ways. In preferred embodiments, the embedded information and any CC data are encoded within mutually exclusive portions of the CC bandwidth such that the merger step 8 creates no risk of loosing encoded data. When the embedded information and the CC data are not encoded simultaneously, the video signal can be examined to insure that neither step results in the loss of data. Alternatively, the embedded information can be inserted into a least used portion of the CC bandwidth such as CC3 or CC4, thereby minimizing any risk of data loss. In any event, a step 8 encodes the video program with the merged CC data and embedded information. Once the video program is encoded in the step 8, the video program is ready for distribution through any variety of mechanisms (e.g., broadcast, sale of video tapes, etc.)

Figure 1B:
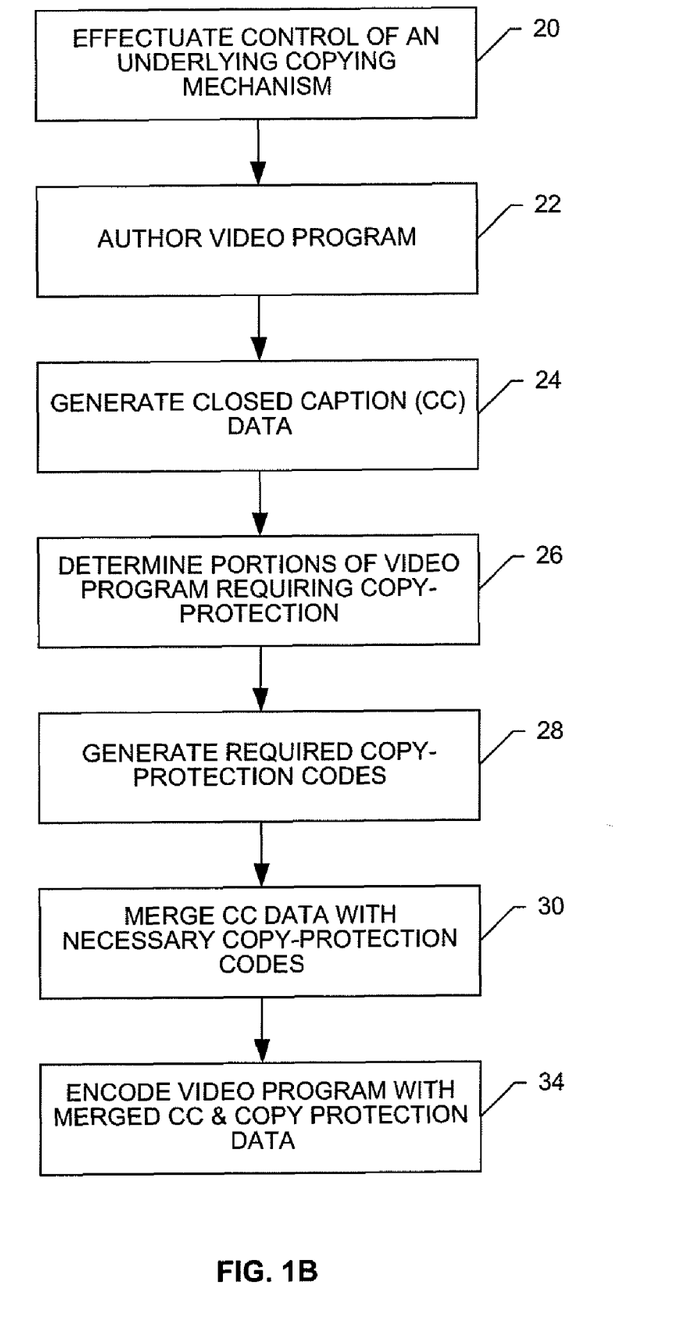
FIG. 1B is a flow chart showing a copy-protection encoding method according to another aspect of the present invention.

FIG. 1B is a flow chart showing a method for embedding copy information in accordance with one embodiment of the present invention. The method 20 effectuates control of an underlying copying mechanism by encoding at the time of video content authoring. The method 20 begins in a content authoring step 22 where a video program is initially authored or created. As will be appreciated, content authoring may accomplished in a variety of ways. For example, content authoring can be done "off-line" in a recording studio, or may be the result of content creation during a live broadcast.

With further reference to FIG. 1B, a step 24 generates any desired CC data intended for use with the video program. The CC data generation may occur simultaneous with content authoring, or may be performed subsequently. The CC data may be created in real time simultaneous with a live broadcast. The step 24 is an optional step, as there may be no need for CC data or perhaps CC data will be later inserted.

A step 26 of FIG. 1B determines or defines those portions of the video program requiring copy-protection. A step 28 generates the required copy-protection codes. The necessary codes depend upon the nature of the underlying anti-protection mechanism and the CC standard adhered to. For example, in the EIA-608 standard (7 bit code, 1 parity), codes 14, 20 (CC1) or 1C, 20 (CC2) may be used to signal the start of the embedded electronic signature, and codes (14, 20) CC1, (1C, 2E) CC2 may be used to signal the end of the embedded electronic signature.

A step 30 merges the CC data together with copy-protection codes to effectuate the required copy-protection. The step 30 can be accomplished in a variety of ways. In preferred embodiments, the copy-protection codes and any CC data are encoded within mutually exclusive portions of the CC bandwidth such that the merger step 30 creates no risk of losing encoded data. When the copy-protection codes and the CC data are not encoded simultaneously, the video signal can be examined to insure that neither step results in the loss of data. Alternatively, the copy-protection codes can be inserted into a least used portion of the CC bandwidth such as CC3 or CC4, thereby minimizing any risk of data loss. In any event, a step 34 encodes the video program with the merged CC data and copy-protection codes. Once the video program is encoded in the step 34, the video program is ready for distribution through any variety of mechanisms (e.g., broadcast, sale of video tapes, etc.)

Figure 2:
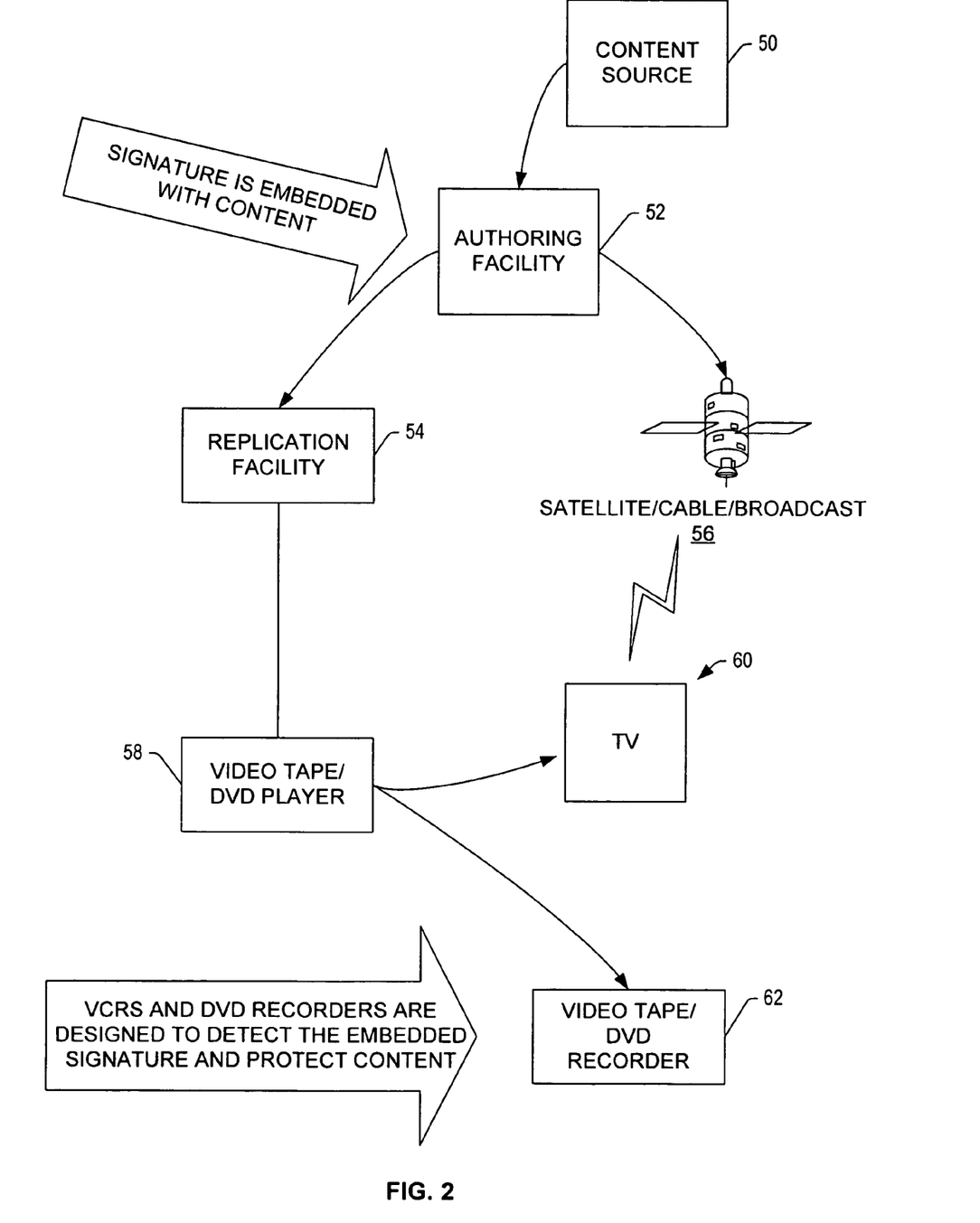
FIG. 2 is a functional block diagram showing a system for embedding data within video content in accordance with one embodiment of the present invention.

FIG. 2 is a block diagram illustrating a system for embedding signature data within video content, wherein such signature data can be used to control the use of such video content. A content source 50 may be a movie, a television network program or any other suitable source for video content. The video content is provided to an authoring facility 52 where an electronic signature is encoded into the video content. Generally this electronic signature will identify a cable service provider or other entity with the legal right to restrict the use of the content. In accordance with a preferred embodiment the electronic signature is encoded in accordance with the process of FIG. 1A above, though other processes may be used within the scope of the present invention. In accordance with a preferred embodiment this electronic signature will be embedded within the CC1 channel of the vertical blanking interval (VBI) of the video content in order to ensure support by all receiving devices. In accordance with alternative embodiments such data may be embedded in various locations within the VBI of a video signal.

This content including an embedded electronic signature may be provided to a replication facility 54 for reproduction upon video media such as DVDs, CDs, DAT, or video tape. The content could also be broadcast via satellite, cable or conventional television transmission directly to viewer's televisions 60 without degradation of video content due to the electronic signature. Alternatively consumers may use a DVD or video tape player 58 to view DVDs or video tapes received from the replication facility 54 on their TVs 60 without degradation of content.

Consumers may wish to record this video content using a VCR or DVD-Recorder 62. In accordance with one embodiment of the present invention VCR/DVD-R 62 will read the video content and retrieve the electronic signature before making a recording. In accordance with a preferred embodiment, DVD-R 62 is operative to prevent the recording of video content to which recording is restricted in response to the data content of the electronic signature. This may be accomplished in several ways. A proprietary control chip may be manufactured within the DVD-Recorder 62, software may be loaded on to the DVD-R/VCR 62 performing a similar copy-protection function, or a recording device 62 may be fitted with a module for performing such a function.

In accordance with one embodiment of the present invention data may be embedded other than a simple electronic signature. Such data may include computer commands to either a set-top-box, TV, or recording device. Such data may also include software updates for a set-top-box, TV, recording device, or other suitable processor based devices.

Figure 3A:
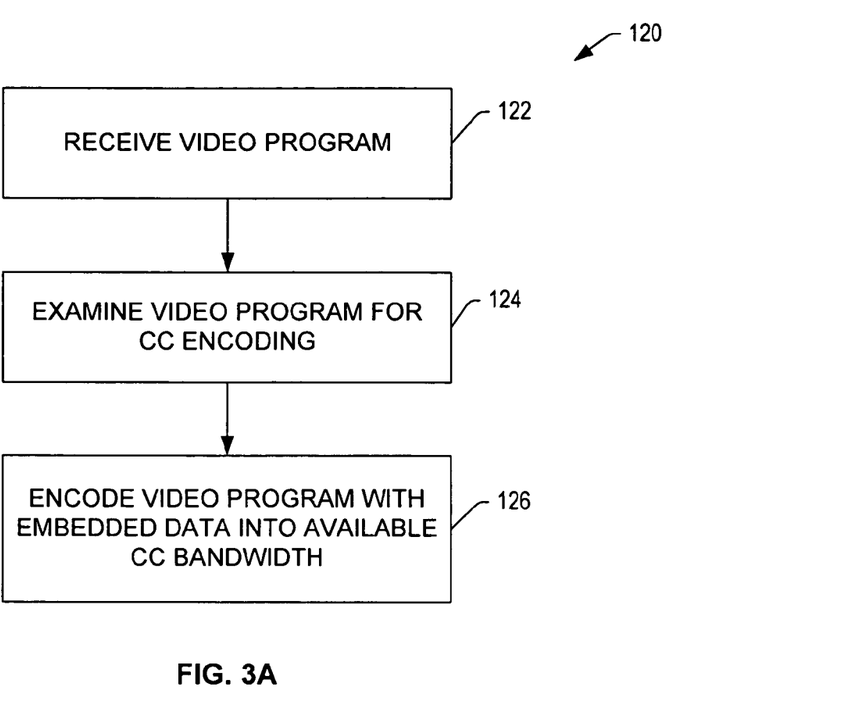
FIG. 3A is a flow chart diagram showing an method for embedding data within the vertical blanking interval (VBI) of a video signal in accordance with another embodiment of the present invention.

FIG. 3A is a flow chart showing a method for embedding data within the VBI of a video signal in accordance with another embodiment of the present invention. The method 120 is suitable for encoding video program with command codes such as electronic signatures, electronic watermarks, or copy-protection codes subsequent to content authoring and CC data encoding. A step 122 receives a video program which may contain CC encoding. Accordingly, a step 124 examines the CC bandwidth of the video program to determine if and where CC information is encoded. A step 126 encodes the video program with embedded coding within unused CC bandwidth. As will be appreciated, the typical video program will have a sufficient surplus of CC bandwidth to enable such encoding. Steps 124 and 126 are typically performed in conjunction, e.g., together frame by frame. Of course the present invention does not preclude any other appropriate analysis of the video program should such an approach be desirable or necessary for a given application.

Figure 3B:
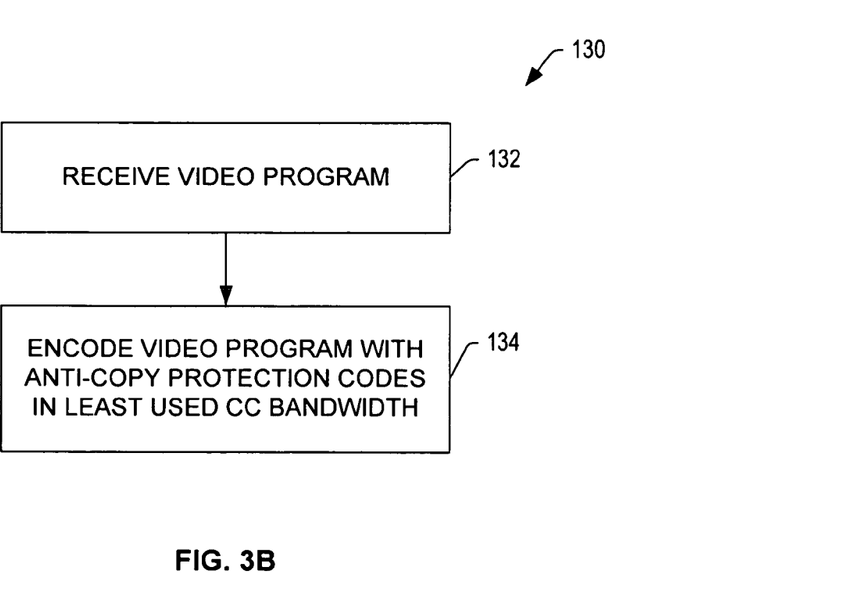
FIG. 3B is a flow chart diagram showing a copy-protection video encoding method in accordance with yet another embodiment of the present invention.

FIG. 3B is a flow chart showing a copy-protection video encoding method in accordance with a third embodiment of the present invention. The method 130 is suitable for encoding a video program with copy-protection codes subsequent to content authoring and CC data encoding. A step 132 receives a video program which may contain CC encoding. The method 130 avoids any complicated CC data analysis by an educated guess as to the whereabouts of available CC bandwidth. Thus a step 134 encodes the video program with copy-protection codes in a least used portion of the CC bandwidth. As will be appreciated, the typical video program has a sufficient surplus of CC bandwidth to enable such encoding without great risk of overwriting data. For example CC3 and CC4 are often unused in typical applications common at the time of filing of the present invention.

Certain digital video standards (e.g., EIA-708) provide for CC capability. Those skilled in the art will readily understand how to modify the methods of FIGS. 1-3 so that they apply within a digital video context supporting CC capabilities. Alternatively, the copy-protection encoding methods described with reference to FIGS. 2-3 may be used in conjunction with a digital video broadcast system by encoding copy-protection data within the digital video program and implementing the encoding methods at any point in the process where the digital video is converted to a video program, e.g. at a user's STB. Underlying copy-protection mechanisms, and the implementation within a digital video broadcast system are described below in more detail.

A plethora of suitable schemes are contemplated for controlling the copy-protection mechanism. A preferred embodiment teaches the insertion of a copy-protection activation code at one or more predefined frequencies within the CC bandwidth. The term "frequency" as used herein is defined loosely as the rate at which copy-protection codes or information are encoded within the video program. As will be described further with reference to FIG. 9, this technique allows the video program receiving device (e.g., STB) to control the copy-protection mechanism based on a sensed frequency of the copy-protection codes within the received video program. In a first embodiment, the copy-protection mechanism is activated by a copy-protection code frequency equal to or greater than a predefined value. The inverse of this is also contemplated; that is, copy-protection may be activated when the copy-protection code frequency falls below a predefined value.

In certain embodiments, the frequency requirement for initiating copy-protection activation may differ from maintaining copy-protection activation. For example, a copy-protection maintenance frequency could be lower than a copy-protection initiation frequency.

It is further contemplated that the nature of the copy-protection may vary depending on the copy-protection code itself, or even upon the frequency of the copy-protection code. The copy-protection mechanism could be responsive to multiple copy-protection codes. By way of example, different copy-protection codes may correspond to different levels of degradation in a subsequent copy including and up to complete prohibition of copying, or even disabling any recording device. Likewise, the level of copy-protection could correspond to a frequency or frequency range of the copy-protection encoding.

The present invention further contemplates an activate/deactivate copy-protection scheme. In the activate/deactivate copy-protection scheme, an activate copy-protection code can be inserted at least once but more likely multiple times into sequential line 21 VBIs of the video signal at a point where activation of the copy-protection mechanism is desired. Similarly, a deactivate copy-protection code is inserted at least once but more likely multiple times into sequential line 21 VBIs at a point where copy-protection is no longer desired in the video signal. A drawback to this embodiment arises in that the user video program access time is unpredictable. Hence if the user accesses the video program after the activate sequence or before the deactivate sequence, the copy-protection mechanism may fail to work properly. Multiple transmissions of the copying sequence may be inserted into the video program to overcome this problem. Details of implementation will be readily apparent to those skilled in the art in light of the present teaching.

Further schemes for controlling the copy-protection mechanism are contemplated. For example, the insertion of one or multiple sequential copy-protection codes could correspond to a predefined time period of activation of the copy-protection code. Alternatively, the copy-protection mechanism could be deactivated by an end of program marker or other feature of the video program rendering the copy-protection mechanism simpler as no deactivate copy-protection code is necessary. In any event, the present invention is not limited by the nature of the underlying copy-protection mechanism, but rather provides a broad framework wherein those skilled in the art will find a powerful solution to a previously inadequately addressed problem.

As will be appreciated, the copy-protection encoding methods of the present invention can be implemented through a variety of devices. In one embodiment, a CC encoder may be designed with enhanced capability for encoding a video signal with the necessary copy-protection codes. Alternatively, a copy-protection encoder lacking closed caption encoding capabilities can be designed for the sole purpose of inserting only the copy-protection codes into the video program. This copy-protection encoder can be used in conjunction with a suitable closed caption encoder as describe below with reference to FIG. 6, or be used alone where no closed captioning encoding capability is desired or necessary. In another embodiment, a separate device provides the copy-protection codes into the input of a standard line closed caption encoder as described below with reference to FIG. 5.

Figure 4:
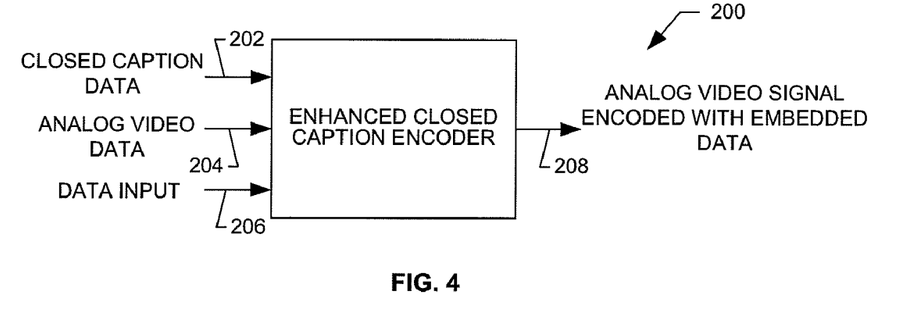
FIG. 4 is a functional block diagram illustrating an encoding system in accordance with one embodiment of the present invention.

FIG. 4 is a block diagram illustrates a data encoding system 200 of the present invention. The data encoding system 200 includes a closed caption data input 202, a video data input 204, a data input system 206, and an encoded video signal output 208. The data encoding system 200 is operable to receive the input data and generate at the encoded video signal output 208 a video signal encoded with the required closed caption and embedded data. As will be appreciated, the data encoding system 200 can be implemented in a variety of ways. For example, the data encoding system 200 can be manufactured as an ASIC. In preferred embodiments such as that described below with reference to FIG. 5, the data encoding system 200 is built of distinct components and utilizes a standard CC encoder.

In a preferred embodiment data to be encoded within the VBI may include command code sequences, copy-protection codes, electronic watermarking, electronic signature or a variety of software for execution on a video data receiver.

Figure 5:
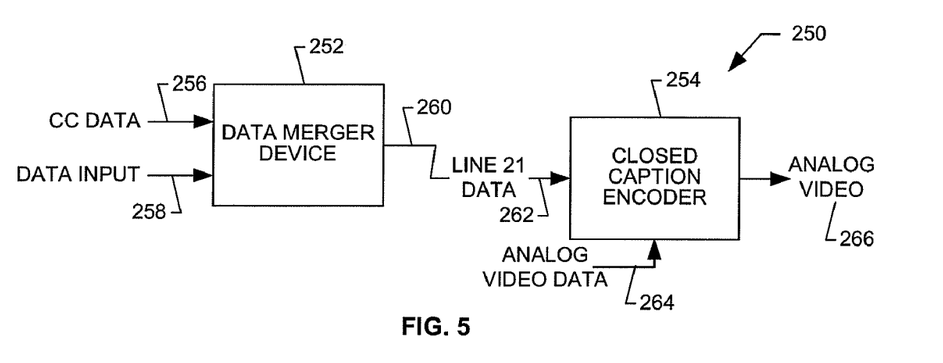
FIG. 5 is a functional block diagram illustrating an encoding system in accordance with another embodiment of the present invention.

FIG. 5 illustrates a preferred embodiment 250 of the data encoder system 200 of FIG. 4. The data encoder system 250 includes a data merger device 252 coupled to a standard closed caption encoder 254. The data merger device 260 includes a closed caption data input 256, a data input module 258, and a line 21 data output 260. The closed caption encoder 254 includes a closed caption data input 262, a video data input 264, and a video output 266.

With further reference to FIG. 5, the data merger device 252 merges the closed caption and embedded data and provides line 21 data at the line 21 data output 260 to the closed caption encoder 254. In turn, the closed caption encoder 254 inserts the line 21 data onto received video data and provides a video output with the desired closed caption and copy-protection coding in place. Note that "line 21" refers specifically to the NTSC standard, however other suitable standards such as PAL are contemplated by the present invention, and those skilled in the art will readily recognize how to implement the present invention in such standards.

Figure 6:
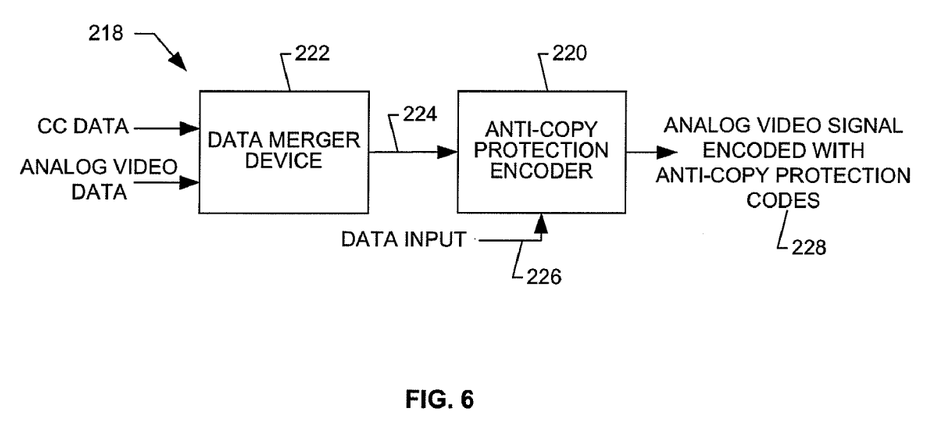
FIG. 6 illustrates a copy-protection encoder in accordance with one embodiment of the present invention.
Figure 7:
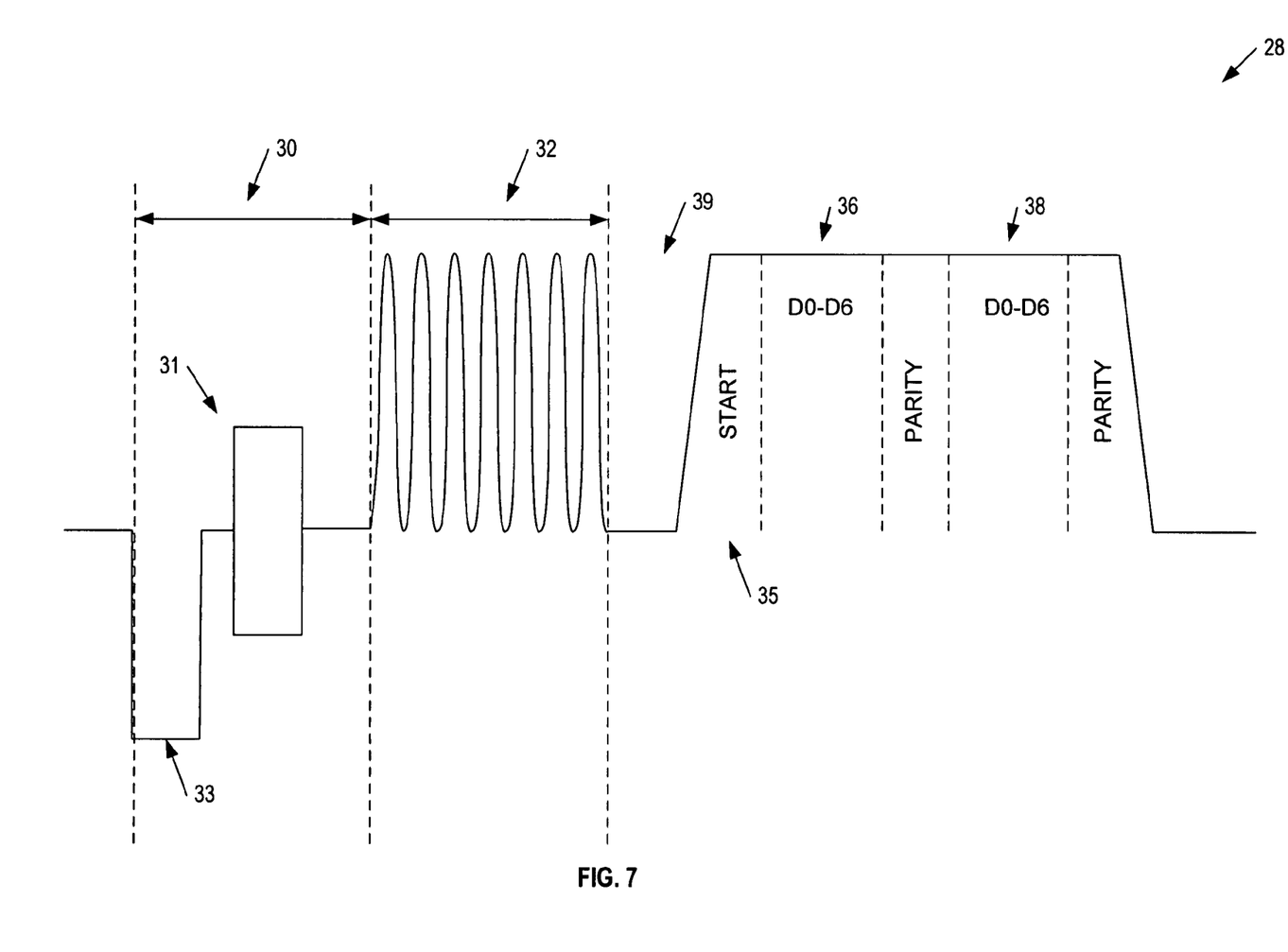
FIG. 7 shows a timing diagram of the NTSC vertical blanking interval of a video waveform.

FIG. 6 illustrates a copy-protection system encoder 218 in accordance with one embodiment in which information embedded within the VBI is copy-protection information. The copy-protection 218 includes a standard closed caption encoder 222 driving a copy-protection encoder 220. The copy-protection encoder 220 has a video data input 224 and a copy data input 226. Upon receipt of both the video data (possibly) containing CC data and the copy data, the copy-protection encoder 220 inserts the copy-protection codes into the video signal as required for the desired copy-protection mechanism, utilizing any suitable method. For example, either methods of FIGS. 2-3 are suitable for implementation within the copy-protection encoder 220 may utilize As previously mentioned, in preferred embodiments of the present invention the copy-protection is encoded into line 21 of a VBI. Accordingly, a brief discussion of closed caption line 21 encoding is now described. FIG. 7 shows a timing diagram 28 of line 21, Field 1, of the vertical blanking interval of an NTSC video waveform. Line 21 of Field 1 of the NTSC VBI contains the closed caption information. In particular, the location of the closed caption character information is shown as CHARACTER 1 (Ref. 36) and CHARACTER 2 (Ref. 38). Each character is made up of 7 bits plus a parity bit. Any pair of 7 bit characters can be encoded in this location of a video field. A single character can also be identified by special codes that require all 16 bits of CHARACTER 1 and CHARACTER 2. Such codes will be referred to subsequently as two byte control codes.

With further reference to FIG. 7, a horizontal synch pulse 33 and color burst signal 31 are present in the 10.50 microsecond region 30, followed by seven cycles of a 503.5 kHz run in clock in the 12.91 microsecond region 32. Immediately following region 32 is a 4.15 microsecond region 39 for stabilization of the data collection clock. Start bit 35 follows region 39. CHARACTER 1 bits D0-D6 plus their parity and CHARACTER 2 bits D0-D6 plus their parity, follow start bit 35. The two eight bit words 36 and 38 are formatted per the USA Standard Code of Information Interchange (USASCII; 3.4-1967) with odd parity. Data clock rate is 503.5 kHz, and is 32 times the horizontal sweep frequency. Similar timing is evident for Field 2, at line 284 instead of line 21, and similar character data may be present as outlined in Xtended Data Services (XDS) in EIA-766.

Further reference to character data or closed caption character data in the vertical blanking interval may apply to digital character data stored on line 21 or line 284, as can be appreciated by those skilled in the art. Although the discussion above specifically refers to the NTSC video standard, a similar comparison can be made to video signals conforming to the PAL standard. The specific line locations of the vertical blanking intervals differ for the two formats, however the general signal pattern is similar enough that one skilled in the art would be able to extract closed caption character information from either format. Therefore, it is to be assumed that in subsequent discussion of closed caption character information present in the vertical blanking interval of a video program, either the NTSC or the PAL formats are applicable, in either or both of field 1 or field 2.

The EIA-608 standard specifies currently assigned two byte control codes. There are numerous other two byte control codes not assigned the EIA specification that can be used for other purposes. For example the unused code (1F,60) can be used to activate copy-protection and the unused code (1F, 61) can be used to deactivate copy-protection.

Figure 8:
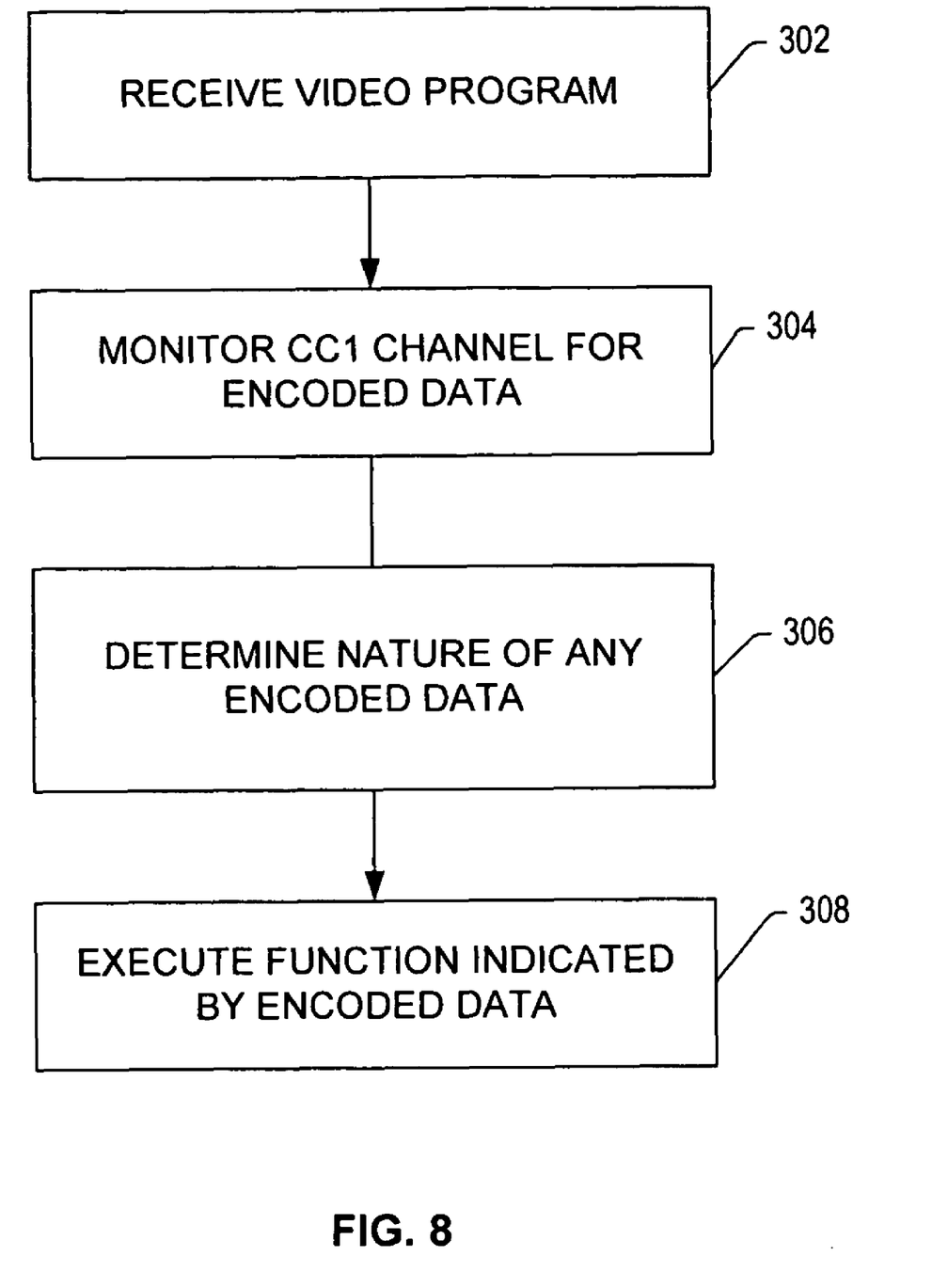
FIG. 8 illustrates a method for decoding an analog video program according to one aspect of the present invention.

FIG. 8 is a flow chart of a method 300 for decoding a video program to determine the frequency and nature of embedded control sequence codes for the control of a video receiver or video recording device. In preferred embodiments, this method is implemented in hardware within a device such as a set top box. This method may also be performed when a video program is being converted into a digital video program in order to provide any desired commands or software within the digital video signal.

The decoding method 300 begins when a step 302 receives a video program. A step 304 monitors the frequency of the embedded control codes present in the video program. Determining the embedded code frequency is easily accomplished by decoding characters embedded in, e.g., line 21 of the VBI and tracking the frequency of matches between the decoded characters and predefined control codes. In preferred embodiments, the receiving device or STB will have CC capability, and parallel processing monitors for and provides any standard closed caption information present in the video signal. A step 306 determines the nature of the command sequence encoding in order to control a receiver/recording mechanism. As described in more detail above, the function of a receiver or recording device can be controlled through different control codes and/or the frequency of the information embedded in the video program. At step 308 an embedded control code sequence is executed by an intended data receiver in response to the frequency and/or nature of the control code sequence. In accordance with one embodiment such embedded code will simply identify the origin of a video program. In accordance with such an embodiment a video recording device will determine whether a particular customer is authorized to record a selected video or audio program.

Figure 9:
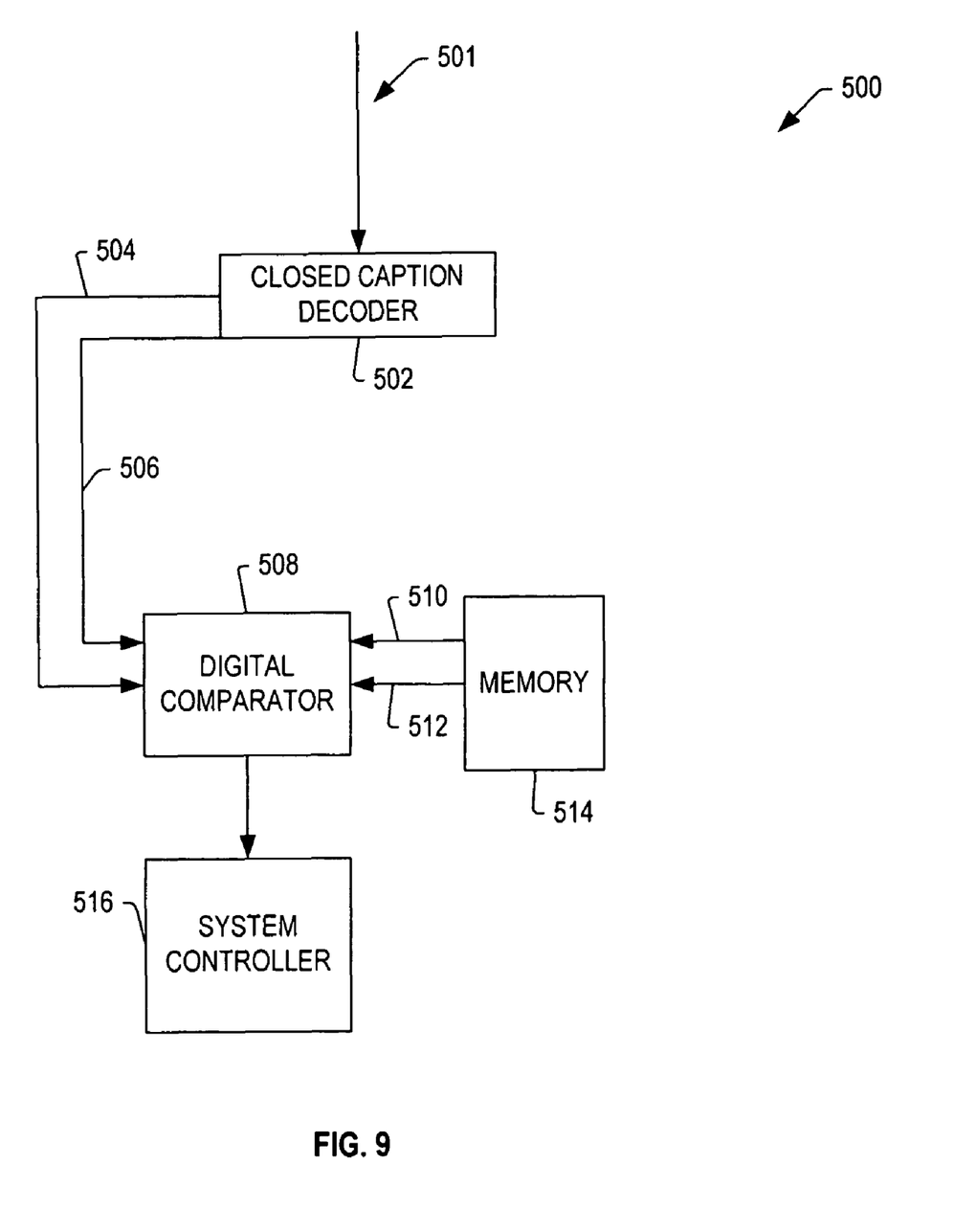
FIG. 9 is a component block diagram showing a frequency based decoding method in accordance with one embodiment of the present invention.

FIG. 9 is a component block diagram showing one possible system 500 suitable for implementing a frequency based decoding method of FIG. 9 in accordance with a two byte character embodiment of the present invention. The system 500 includes a standard closed caption decoder 502, a digital comparator 508, a memory 514, and a system controller 516.

In operation, the video program 501 is fed to the standard closed caption decoder 502. The encoded bit patterns for CHARACTER 1 (Ref. 36) and CHARACTER 2 (Ref 38) are determined by the decoder 502 and transmitted over 8 bit data busses 504 and 506 to the digital comparator 508. The digital comparator 508 receives a previously stored code from the memory 514 via data busses 512 and 510. These previously saved codes may be provided to the user as part of new equipment when purchased, or periodically updated by the user or equipment manufacturer at some later date. Each time a two byte code is matched to a reference code, the comparator 508 transmits a signal (e.g., pulse) to the system controller 516. In turn, the system controller 516 monitors signals from the comparator 508, and controls the copy-protection mechanism as required.

Those skilled in the art will readily understand how the above-described embodiments are applicable to a digital video supporting CC encoding. However, the teaching of the present invention is not limited to and digital video platforms supporting CC encoding. Accordingly, a method and system for incorporating aspects of the present invention into digital video formats not supporting CC encoding will now be described below with reference to FIG. 10.

Figure 10:
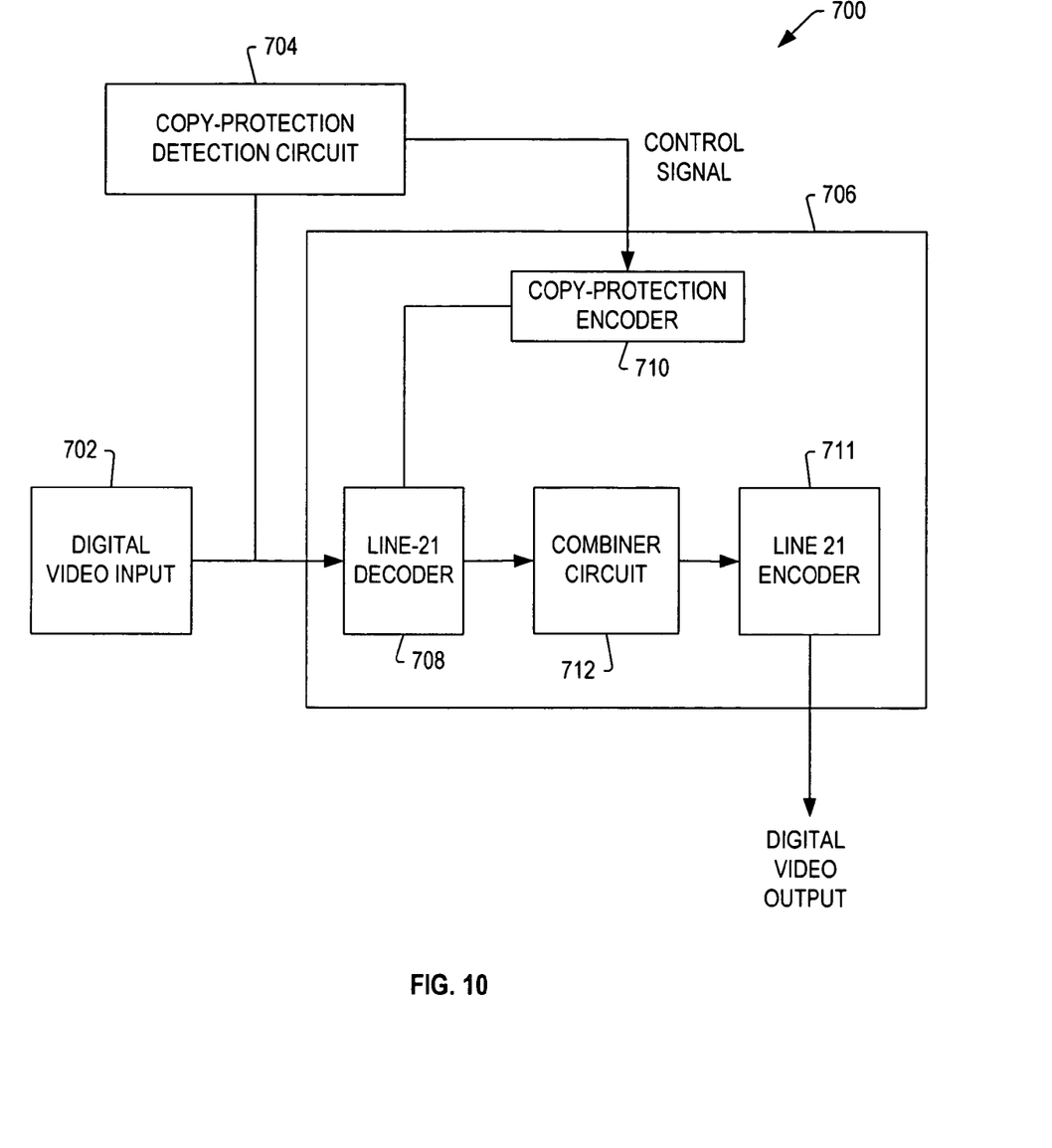
FIG. 10 is a functional block diagram of a hardware system for the decoding of digital video data in accordance with yet another embodiment of the present invention.

FIG. 10 illustrates a hardware system 700 for the insertion of copy-protection codes in accordance with another embodiment of the preferred invention. The hardware system 700 includes a digital video input source 702, and a digital to copy-protection encoding device 706. The encoding device 706 includes a Line-21 decoder 708, a copy-protection encoder 710, a line 21 encoder 711, and a combiner circuit 712. The data source 702 provides video data to the encoding device 706 which in turn is fed to the decoder 708 for the generation of closed caption signals. The detection circuit 704 monitors the digital data to determine whether copy-protection is indicated within the copy-protection field of the digital video data. In turn the detection circuit 704 is operable to control the copy-protection encoder 710 so that copy-protection codes are inserted in the required location of the video signal. The output of the line 21 encoder 706 and the digital decoder 708 are provided at inputs of the combiner circuit 712. The combiner circuit 712 generates the video output with the required copy-protection inserted.

As will be appreciated, the copy-protection of the present invention can be implemented in a variety of ways. For example, the copy-protection may be absolute; that is, when the copy-protection mechanism is active copying may be fully prohibited. Alternatively, the active copy-protection mechanism may simply cause any recording to be degraded through some mechanism readily understood in the prior art. In more complicated systems, different levels of activation may be provided to the system such that a certain code may correspond to absolute prohibition of copying, while other codes may result in predefined levels of degradation, or other copying protection actions.

What is claimed is:

1. A method, comprising:
examining a bandwidth of a vertical blanking interval (VBI) of a video to determine where existing data is encoded;
identifying an unused portion of the bandwidth of the vertical blanking interval;
embedding information in the unused portion of the bandwidth in the vertical blanking interval;
wherein the information includes a signature embedded in the bandwidth in the vertical blanking interval;
wherein said signature is not visible on a display monitor of a receiving device;
wherein the bandwidth carries visible data interspersed with said signature such that said signature is detectable by a receiving device; and
wherein said receiving device is operable to display said visible data and not display said signature.

2. The method as recited in claim 1, further comprising generating said video.

3. The method as recited in claim 2, wherein the generating said video includes authoring content of said video such that the embedding can be performed in conjunction with said authoring of content of said video.

4. The method as recited in claim 2, wherein the generating said video includes receiving the video as previously authored video content.

5. The method as recited in claim 2, further comprising generating closed captioning (CC) data suitable for encoding in said video.

6. The method as recited in claim 5, wherein said closed captioning (CC) data is encoded into said video prior to embedding the information.

7. The method as recited in claim 1, wherein a command is activated in response to said information having been embedded at a selected frequency within said video;
wherein said selected frequency is greater than or equal to a predefined frequency.

8. The method as recited in claim 7; wherein said information includes copy-protection data that provides for multiple levels of copy-protection.

9. The method as recited in claim 8, wherein said multiple levels of copy-protection include a first level degrading subsequent copies of said video program.

10. The method as recited in claim 8, wherein said multiple levels of copy-protection include a severe level barring generation of subsequent copies of said video.

11. The method as recited in claim 8, wherein each of said multiple levels of copy-protection mechanism include a corresponding copy-protection code.

12. The method as recited in claim 1, wherein said information is embedded into a least used portion of the bandwidth.

13. The method as recited in claim 12, wherein the least used portion of the bandwidth includes, one or more of, the closed captioning channel 3 (CC3) and closed captioning channel 4 (CC4).

14. The method as recited in claim 1, wherein said information comprises a command code sequence;
wherein a receiving device receives the command code sequence and executes a command associated with said command code sequence.

15. The method as recited in claim 14, the method further comprising:
receiving the video via the receiving device;
detecting a frequency of an embedded control sequence code;
identifying the command code sequence corresponding to the embedded control sequence code; and
executing the command code sequence.

16. The method as recited claim 1, wherein the video includes an analog video program.

17. The method as recited in claim 1, wherein the information is embedded in line 16 of the vertical blanking interval (VBI).

18. The method as recited in claim 1, wherein the bandwidth includes a closed captioning channel.

19. The method as recited in claim 1, wherein the information includes software updates for the receiving device.

20. A system for embedding information in a video signal, the system comprising:
means for, producing the video signal;
means for, examining a bandwidth of a vertical blanking interval of the video signal to determine where existing data is encoded;
means for, embedding information in the bandwidth in the vertical blanking interval;
wherein the information includes a signature embedded in the bandwidth in the vertical blanking interval;
wherein said signature is not visible on a display monitor of a receiving device;
wherein the bandwidth carries visible data interspersed with said signature such that said signature is detectable by a receiving device; and
wherein said receiving device is operable to display said visible data and not display said signature.

21. The system of claim 20, further comprising:
means for, receiving said video signal including said embedded information;
means for, retrieving copy-protection data in the embedded information; and
means for, preventing copying in response to said copy-protection data.

22. The system of claim 20, further comprising:
means for, retrieving command code sequence in the embedded information; and
means for, executing at least one command in response to said command code sequence.

23. The system of claim 20, wherein said information is embedded within line 21 of the vertical blanking interval in order to prevent removal by a third party.

24. The system of claim 20, wherein said information includes data which will not be recognized as characters to be visually displayed on a monitor screen.

25. A system comprising:
a content source for producing a video;
a closed captioning encoder for merging closed captioning data with the video;
an examining mechanism for determining where the closed captioning data is encoded in a closed caption channel of the vertical blanking interval of the video signal;
a copy-protection encoder for embedding copy-protection codes in an unused portion of the closed caption channel in the vertical blanking interval of the video such that the closed captioning data encoded in the closed caption channel is not lost;
wherein the copy-protection codes include a signature;
wherein said signature is not visible on a display monitor of a receiving device;
wherein the bandwidth carries visible data interspersed with said signature such that said signature is detectable by a receiving device; and
wherein said receiving device is operable to display said visible data and not display said signature.

26. The system of claim 25, further comprising, an enhanced closed captioning encoder that combines the closed captioning encoder with the copy-protection encoder.

27. The system of claim 25, further comprising, a decoding device to control the receiving device for viewing, displaying, or recording.

28. A method, comprising:
examining a bandwidth of a closed caption channel of a vertical blanking interval to determine where existing data is encoded;
embedding a copy-protection code in an unused portion of the bandwidth of the closed caption channel of the vertical blanking interval; and
encoding a video program with the copy-protection code embedded in the closed caption channel of the vertical blanking interval;
wherein the copy-protection code includes a signature;
wherein said signature is not visible on a display monitor of a receiving device;
wherein said signature is not visible on a display monitor of a receiving device;
wherein the bandwidth carries visible data interspersed with said signature such that said signature is detectable by a receiving device; and wherein said receiving device is operable to display said visible data and not display said signature.

29. A method of embedding information in a video signal, the method, comprising:
embedding information in a vertical blanking interval of the video signal;
wherein the information includes a signature embedded in a bandwidth of the vertical blanking interval;
wherein said signature is not visible on a display monitor of a receiving device;
wherein the bandwidth carries visible data interspersed with the signature such that the signature is detectable by a receiving device; and
wherein the receiving device is operable to display the visible data and not display the signature.

* * * * *